(12) United States Patent
Toomajian et al.

(10) Patent No.: US 12,109,523 B2
(45) Date of Patent: Oct. 8, 2024

(54) SYSTEMS AND METHODS OF REDUCING AIRBORNE PATHOGENS AND CONTAMINANTS IN A BREATHING ZONE

(71) Applicants: Martin E. Toomajian, Brighton, MI (US); Timothy E. Moore, Auburn, AL (US)

(72) Inventors: Martin E. Toomajian, Brighton, MI (US); Timothy E. Moore, Auburn, AL (US)

(73) Assignee: MagPlasma, Inc., Brighton, MI (US)

( * ) Notice: Subject to any disclaimer, the term of this patent is extended or adjusted under 35 U.S.C. 154(b) by 511 days.

(21) Appl. No.: 17/227,347

(22) Filed: Apr. 11, 2021

(65) Prior Publication Data

US 2021/0322915 A1    Oct. 21, 2021

Related U.S. Application Data

(60) Provisional application No. 63/010,054, filed on Apr. 15, 2020.

(51) Int. Cl.

| | |
|---|---|
| *B01D 46/00* | (2022.01) |
| *B01D 46/10* | (2006.01) |
| *B01D 46/44* | (2006.01) |
| *F24F 3/163* | (2021.01) |
| *F24F 8/108* | (2021.01) |

(52) U.S. Cl.
CPC ........... *B01D 46/10* (2013.01); *B01D 46/444* (2013.01); *F24F 3/163* (2021.01); *B01D 2265/028* (2013.01); *B01D 2275/10* (2013.01); *B01D 2279/65* (2013.01)

(58) Field of Classification Search
CPC .... B01D 46/12; B01D 46/0028; B01D 39/12; B01D 2279/65; A61L 9/20; B64D 11/0632; B64D 13/06
USPC ...... 55/385.1, 385.2, 356, DIG. 18, DIG. 46, 55/DIG. 34; 454/187
See application file for complete search history.

(56) References Cited

U.S. PATENT DOCUMENTS

| | | | | |
|---|---|---|---|---|
| 3,369,343 | A * | 2/1968 | Robb .................. | B01D 63/081 55/385.2 |
| 4,360,018 | A * | 11/1982 | Choksi ................. | A61M 16/08 55/DIG. 35 |
| 6,702,662 | B2 * | 3/2004 | Kristensson ........... | F24F 3/163 454/189 |
| 6,780,213 | B2 * | 8/2004 | Chang .................... | B08B 15/04 55/385.2 |
| 8,414,671 | B2 * | 4/2013 | Augustine ........... | A61G 13/108 55/467 |

(Continued)

*Primary Examiner* — Minh Chau T Pham
(74) *Attorney, Agent, or Firm* — John A. Miller; Shumaker, Loop & Kendrick, LLP

(57) ABSTRACT

A system for reducing airborne pathogens and contaminants in a breathing zone of a person is disclosed. A manifold assembly includes a tube fitted with an air intake nozzle. The air intake nozzle is positioned at the breathing zone of the person such that an air gap is created between the person and the nozzle. Exhaled air is routed from the person to the manifold assembly via the tube. A purification unit deactivates and/or filters airborne pathogens and contaminants of the exhaled air supplied from the manifold assembly. A suction assembly draws the exhaled air from the breathing zone of the person, through the manifold assembly and the purification unit, to a one-way exhaust valve.

21 Claims, 3 Drawing Sheets

(56) References Cited

U.S. PATENT DOCUMENTS

| | | | |
|---|---|---|---|
| 9,310,088 B2* | 4/2016 | Melikov | G16H 50/80 |
| 11,590,442 B2* | 2/2023 | Misawa | B64D 11/0632 |
| 2002/0129710 A1* | 9/2002 | Ammouri | B03C 3/32 |
| | | | 55/385.2 |
| 2009/0094950 A1* | 4/2009 | Wei | G05D 7/0641 |
| | | | 73/1.16 |
| 2010/0233019 A1* | 9/2010 | Al-Thallab | B01D 46/0028 |
| | | | 422/4 |
| 2014/0260131 A1* | 9/2014 | Burkhauser | A01G 9/246 |
| | | | 55/385.2 |
| 2020/0361772 A1* | 11/2020 | Hall | H01J 37/32146 |
| 2021/0346564 A1* | 11/2021 | Jetter | A61L 9/20 |
| 2021/0386133 A1* | 12/2021 | Doyle | B01D 39/1676 |
| 2022/0126126 A1* | 4/2022 | Clack | A62B 18/084 |

* cited by examiner

SYSTEMS AND METHODS OF REDUCING AIRBORNE PATHOGENS AND CONTAMINANTS IN A BREATHING ZONE

CROSS-REFERENCE TO RELATED APPLICATIONS

This application claims priority to U.S. Provisional Application Ser. No. 63/010,054, filed Apr. 15, 2020, titled "SYSTEMS AND METHODS OF REDUCING AIRBORNE PATHOGENS AND CONTAMINANTS IN A PATIENT AREA", hereby incorporated by reference in its entirety for all of its teachings.

TECHNICAL FIELD

This invention relates to reducing airborne pathogens and contaminants. More specifically, this invention relates to reducing airborne pathogens and contaminants in the breathing zone of a person using utilizing entrapment and/or active neutralization technologies and employing a vacuum air intake assembly coupled with a manifold assembly to draw contaminated exhalation air from the person.

BACKGROUND OF THE INVENTION

America faces a serious threat to our personal and economic health due to new, highly contagious viruses, such as the COVID-19 virus, as well as numerous hospital acquired contagions. These contagions are spread by infected individuals (asymptomatic and symptomatic) via particle release from respiration, coughing, sneezing and subsequent surface contamination and contact or inhalation by a new host. A significant number of patients become seriously ill from the infection and require hospitalization, which increases the likelihood of exposure to healthcare workers and intrahospital spread of the contagion. A smaller but still sizable number require the use of assisted breathing support via a manual or automated ventilator system due to complications from pneumonia. The recent COVID-19 outbreak demonstrates how easily existing hospital intensive care units (ICUs) and isolation wards can become overwhelmed when contagion dosages become concentrated enough to overcome healthcare workers' personal protective equipment. Hospital, and other healthcare facilities become overwhelmed when the high volume and density of patients ensures that hospitals and other treatment locations become significantly loaded with viral particles that can remain airborne for hours before coming to rest on various surfaces, thus multiplying the potential for exposure of medical staff and other patients.

SUMMARY OF THE INVENTION

Embodiments of the present invention attempt to reduce airborne pathogens and contaminants, such as viruses and bacteria, and subsequently reduce interior surface contamination through the use of a simple, portable system that utilizes entrapment and/or active neutralization technologies combined with a suction assembly, such as a vacuum pump or fan, to actively collect and draw away from infected people and patient exhaled air for the purposes of reducing room airborne contamination. Systems and methods of the present invention are available for use with any person who may be infectious or contaminated with a virus, bacterium, or other contagion, and may be used in any location loaded with viral particles such as, but not limited to, clinics, hospitals, nursing homes, bathrooms, offices, buildings, temporary structures, and personnel transport vehicles including ambulances, emergency medical treatment (EMT) vehicles, buses, taxis, law enforcement vehicles, and medivac aircraft.

In one embodiment of the present invention, a system for reducing airborne pathogens and contaminants in a breathing zone of a person is disclosed. The system includes a manifold assembly including a tube fitted with an air intake nozzle. The air intake nozzle is positioned at a breathing zone of the person such that an air gap is created between the person and the nozzle. Exhaled air is routed from the person to the manifold assembly via the tube. The system also includes a purification unit for purifying air by deactivating and/or filtering airborne pathogens and contaminants of the exhaled air supplied from the manifold assembly. The system further includes a suction assembly for drawing the exhaled air from the breathing zone of the person, through the manifold assembly and the purification unit, to a one-way exhaust valve.

In one embodiment, the system further comprises a pretreatment filter coupled to an exit port of the manifold assembly, and a mass flow controller to adjust air flow of the pretreated exhaled air introduced into the purification unit for treatment to maintain a constant air flow rate or system pressure. In one embodiment, the system also comprises a post-treatment filter coupled between an outlet port of the suction assembly and an inlet of the exhaust valve.

The manifold assembly may comprise a multi-port valve coupled to the tube, wherein the tube has a first end coupled to the air intake valve and a second end coupled to the manifold assembly. The tube may be, but is not limited to, a polymer composite tube, a duct, or a hose assembly.

In some embodiments, the air intake nozzle is a snorkel having a nozzle end for directing the exhaled air from the breathing zone of the person into the tube. The air intake nozzle may be positioned between approximately one and ten inches from the breathing zone of the person, maintaining the air gap between the person and the nozzle.

The suction assembly may be a vacuum pump or a fan.

The airborne pathogens and contaminants are viruses, bacteria, or other microorganisms that can cause disease in humans. The viruses may be, but are not limited to, coronaviruses such as SARS-CoV-2.

The system may be portable or movable and used at one or more of the following settings or locations: clinics, hospitals, nursing homes, bathrooms, offices, buildings, temporary structures, and personnel transport vehicles including ambulances, emergency medical treatment (EMT) vehicles, buses, taxis, law enforcement vehicles, and medivac aircraft.

In another embodiment of the present invention, a method of reducing airborne pathogens and contaminants in a breathing zone of a person is disclosed. The method includes routing exhaled air from a breathing zone of a person through an air intake nozzle to a manifold assembly via a tube. The tube is coupled between an outlet of the nozzle and an inlet port of the manifold assembly. An air gap is created between the person and the nozzle. The method also includes deactivating and/or filtering airborne pathogens and contaminants of the exhaled air, supplied from the manifold assembly, using a purification unit. The method further includes drawing the exhaled air from the person, through the manifold assembly and the purification unit, to a one-way exhaust valve.

In some embodiments, the method also includes pretreating the exhaled air from the manifold assembly prior to entry into the purification unit and adjusting air flow of the pretreated exhaled air introduced into the purification unit for treatment.

In some embodiments, the method further includes post-treating the exhaled air after exiting the purification unit prior to entry to the one-way exhaust valve.

In another embodiment of the present invention, a system for reducing airborne pathogens and contaminants in a breathing zone of a person is disclosed. The system includes a manifold assembly including a multi-port valve coupled to multiple tubes. Each tube is fitted with an air intake nozzle positioned at breathing zones of one or more persons such that an air gap is created between each person and each nozzle. Exhaled air is routed from each person to the manifold assembly via the tubes. The system also includes a purification unit for deactivating and/or filtering airborne pathogens and contaminants of the exhaled air supplied from the manifold assembly. The system further includes a suction assembly for drawing the exhaled air from each person, through the manifold assembly and the purification unit, to a one-way exhaust value.

DETAILED DESCRIPTION OF THE PREFERRED EMBODIMENTS

Figure 1:
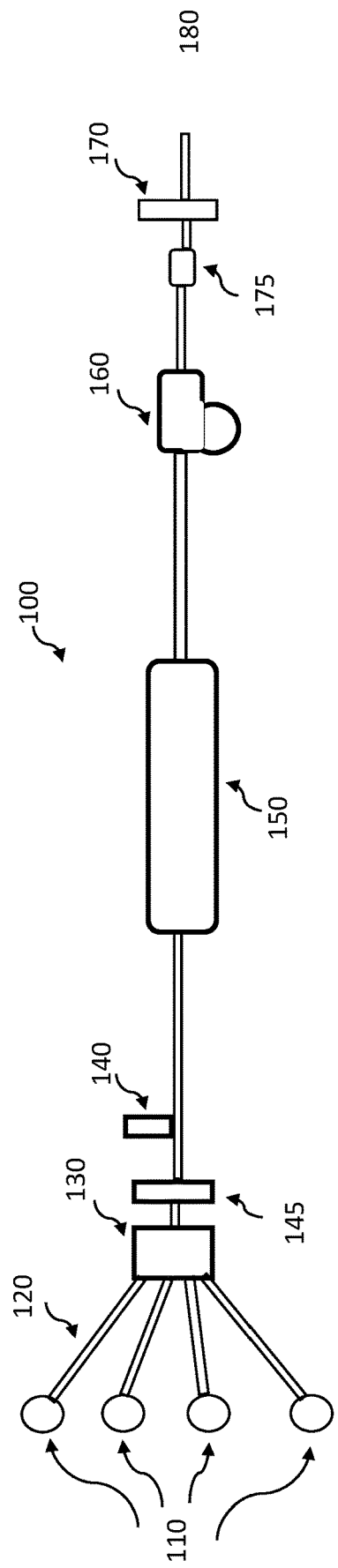
FIG. 1 is a schematic diagram of a system for reducing airborne pathogens and contaminants in the breathing zone of a person, in accordance with one embodiment of the present invention.

FIG. 1 is a schematic diagram of a system 100 for reducing airborne pathogens and contaminants in the breathing zone of a person, in accordance with one embodiment of the present invention. The system includes a manifold 130 with at least one port to permit coupling to one or more tubes 120. The tubes 120 may be flexible polymer tube, plastic tubes, or hoses, and each tube 120 is fitted with an air intake nozzle 110 positioned at a breathing zone of a person or patient (not shown in FIG. 1) for directing exhaled air from the person into the tubes 120. It should be noted that the manifold 130 can have one tube, two tubes, or three or more tubes, with each tube 120 fitted with an air intake nozzle 110.

The breathing zone is an area close the mouth and nostrils of a person, between one to ten inches of the person's face, and allows for an air gap between the person and the nozzle 110. Thus, the air intake nozzle 110 should be positioned close to the face of the person but not intrusive, and the placement of the nozzle 110 vis-à-vis the person will serve to reduce the amount of vacuum required to capture and move a contaminated air stream. In some embodiments, the air intake nozzle 110 is positioned within a few inches of the person. In another embodiment, the air intake nozzle 110 is positioned between one to six inches from a patient or a patient's intubation assembly.

The placement of the nozzle 110 at the breathing zone of the person may be accomplished by way of a clamp or other similar device. In some embodiments, the nozzle 110 is a snorkel having a nozzle end for directing exhaled air from the person into the tube 120.

The system 100 includes a purification unit for purifying air by deactivating and/or filtering airborne pathogens and contaminants of the exhaled air supplied from the manifold 130. In the embodiment of FIG. 1, the purification unit includes a HEPA (High Efficient Particle Air) pre-filter 145, a plasma reactor or chamber 150, and a HEPA post-filter 170. The HEPA pre-filter 145, arranged upstream of the plasma chamber 150, removes at least 95% of the particulates as small as 0.3 microns in size from the air stream. The plasma chamber 150, arranged between the HEPA pre-filter 145 and the HEPA post-filter 170, is able to inactivate or remove from the air stream 99.9% of the particulates, with the vast majority due to inactivation. Any remaining particles are removed or captured by the HEPA post-filter 170, which captures up to 99.9% of the most difficult particle to filter-size 0.3 micron particles-including viruses, bacteria, dust, pollen, and mold. A carbon filter 175 is included for the removal of odors and any remaining particles of contaminant from the air flow. By passing through the HEPA filters 145 and 170 and the plasma chamber 150, the purification unit diminishes a virus's ability to infect cells. A mass flow controller 140, positioned between the HEPA pre-filter 145 and the plasma chamber 150, adjusts the air flow which is introduced into the plasma chamber 150 for treatment of the exhaled air.

A vacuum pump 160 creates a pressure differential to draw the air stream through the components discussed herein. The pump 160 draws the exhaled air through the filters 145 and 170 and the pressure chamber 150, and returns filtered and treated air to an exhaust outlet 180 and back to the room, a HVAC unit, or to the atmosphere. The pressure differential is the main driving force for the movement of the air stream within the system, and the vacuum pump 160 is capable of creating sufficient negative pressure through the tubes 120 to prevent or reduce free release of viral laden exhaled air. It should be noted that one or more of the filters 145, 170, 175, including the plasma chamber 150, may be optional and positioned at different locations of the system.

Figure 2:
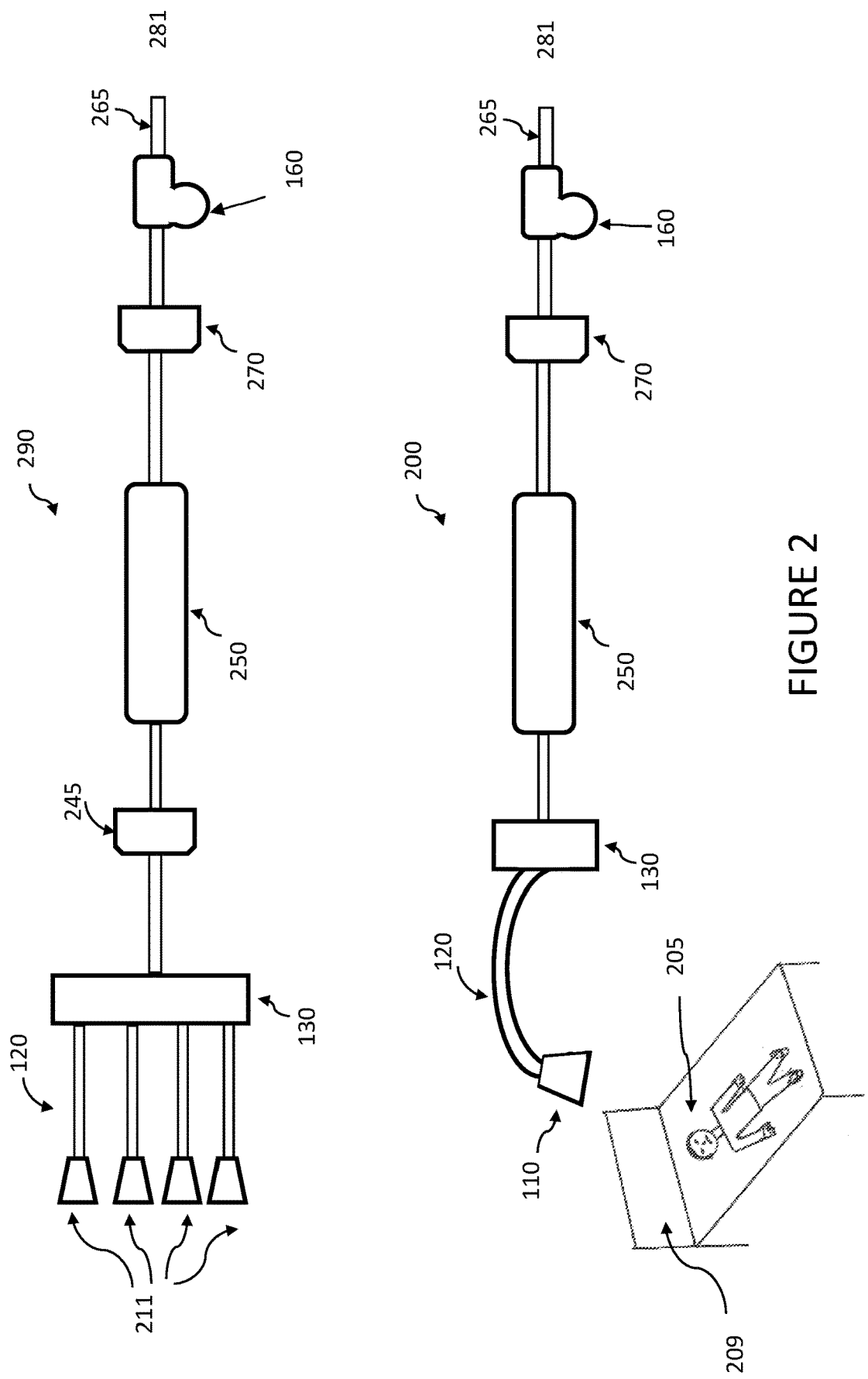
FIG. 2 is a schematic diagram of a system for reducing airborne pathogens and contaminants in the breathing zone of a person, in accordance with one embodiment of the present invention.

FIG. 2 is a schematic diagram of a system 200 for reducing airborne pathogens and contaminants in the breathing zone of a person, in accordance with one embodiment of the present invention. In the embodiment shown at the bottom of the diagram, an air intake exhaust 110 or nozzle is placed near the headboard 209 area of a patient 205 for directing exhaled air from the patient 205 to an exhaust hose assembly or tube 120. The tube 120, which is coupled to a manifold 130, routes the air from the patient 205 location through a first filter 145 (FIG. 1), an active destruction unit 250, and a second filter 270. The one or more filters 145 (FIG. 1) and 270 may be a HEPA/ULPA filter. The active destruction unit 250 may be a plasma reactor or chamber. The vacuum pump 160 draws the exhaled air through the filters 145 (FIG. 1) and 270 and the active destruction unit 250 and returns filtered and treated air to the patient treatment area 281 or, alternatively, to the atmosphere or to an air handling unit, via an exhaust line 265.

Still referring to FIG. 2, in the embodiment shown at the top of diagram, the system 290 is incorporated to include multiple air intake nozzles 110 to draw exhaled air from multiple patients in a treatment area 211 using one or more hoses or tubes 120 coupled a manifold 130. The exhaled air collected from the multiple patients is then routed through a first stage particulate filter 245, an active destruction unit 250 which may be, but is not limited to, a plasma unit, and a second stage particulate filter 270. The vacuum pump 160, which draws the exhaled air through the filters 245 and 270 and active destruction unit 250, exhausts the treated air to the atmosphere 281, back to the patient treatment area, or to an air handling unit, via an exhaust line 265.

Figure 3:
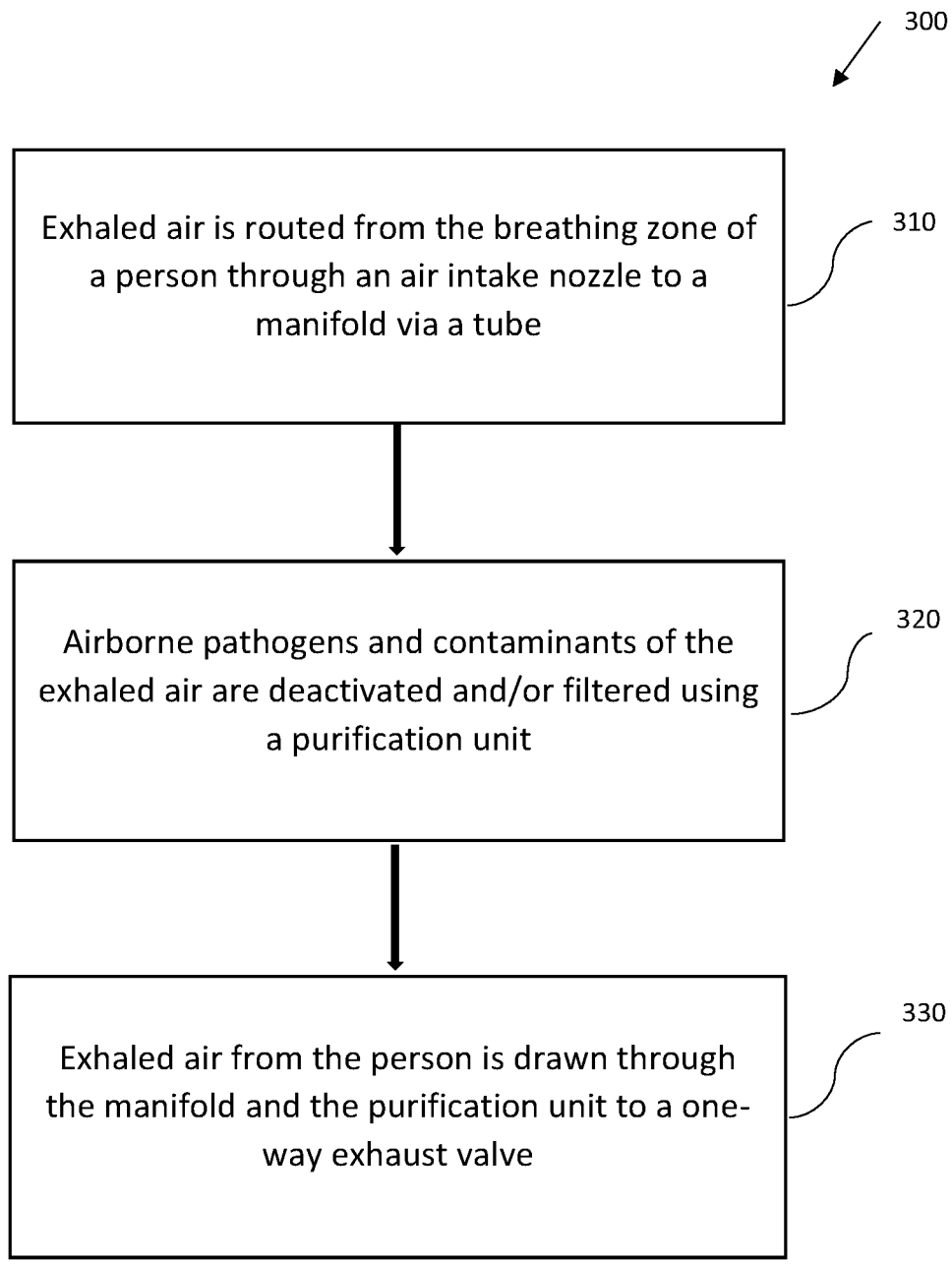
FIG. 3 is a flowchart illustration of a method of reducing airborne pathogens and contaminants in the breathing zone of a person, in accordance with one embodiment of the present invention.

FIG. 3 is a flowchart 300 illustration of a method of reducing airborne pathogens and contaminants in the breathing zone of a person, in accordance with one embodiment of the present invention. In 310, exhaled air is routed from the breathing zone of a person through an air intake nozzle to a manifold assembly via a tube. Next, in 320, airborne pathogens and contaminants of the exhaled air are deactivated and/or filtered using a purification unit. Exhaled air from the person is drawn through the manifold and the purification unit to a one-way exhaust valve, in 330.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A system for reducing airborne pathogens and contaminants in a breathing zone of a person comprising:
   a. a manifold assembly including a tube fitted with an air intake nozzle positioned at a breathing zone of a person such that an air gap is created between the person and the nozzle, wherein exhaled air is routed from the person to the manifold assembly via the tube;
   b. a purification unit for purifying air by deactivating and/or filtering airborne pathogens and contaminants of the exhaled air supplied from the manifold assembly; and
   c. a suction assembly for drawing the exhaled air from the breathing zone of the person, through the manifold assembly and the purification unit, to a one-way exhaust valve.

2. The system of claim 1 further comprising a pretreatment filter coupled to an exit port of the manifold assembly, and a mass flow controller to adjust air flow of the pretreated exhaled air introduced into the purification unit for treatment to maintain a constant air flow rate or system pressure.

3. The system of claim 2 further comprising a post-treatment filter coupled between an outlet port of the suction assembly and an inlet of the exhaust valve.

4. The system of claim 1 wherein the manifold assembly comprises a multi-port valve coupled to the tube, wherein the tube has a first end coupled to the air intake nozzle and a second end coupled to the manifold assembly.

5. The system of claim 4 wherein the tube is one of the following: a polymer composite tube, a duct, and a hose assembly.

6. The system of claim 4 wherein the air intake nozzle is a snorkel having a nozzle end for directing the exhaled air from the breathing zone of the person into the tube.

7. The system of claim 1 wherein the suction assembly is a vacuum pump or a fan.

8. The system of claim 1 wherein the air intake nozzle is positioned between approximately one and ten inches from the breathing zone of the person, maintaining the air gap between the person and the nozzle.

9. The system of claim 1 wherein the airborne pathogens and contaminants comprise viruses and bacteria.

10. The system of claim 9 wherein the viruses comprise coronaviruses such as SARS-CoV-2.

11. The system of claim 1 wherein the system is portable.

12. The system of claim 1 wherein the system is used in at least one of the following settings or locations: clinics, hospitals, nursing homes, bathrooms, offices, ambulances, emergency medical treatment (EMT) vehicles, buses, taxis, law enforcement vehicles, and medical aircraft.

13. A method of reducing airborne pathogens and contaminants in a breathing zone of a person comprising:
   a. routing exhaled air from a breathing zone of a person through an air intake nozzle to a manifold assembly via a tube coupled between an outlet of the nozzle and an inlet port of the manifold assembly, wherein an air gap is created between the person and nozzle;
   b. deactivating and/or filtering airborne pathogens and contaminants of the exhaled air, supplied from the manifold assembly, using a purification unit; and
   c. drawing the exhaled air from the person, through the manifold assembly and the purification unit, to a one-way exhaust valve.

14. The method of claim 13 further comprising pretreating the exhaled air from the manifold assembly prior to entry into the purification unit and adjusting air flow of the pretreated exhaled air introduced into the purification unit for treatment.

15. The method of claim 14 further comprising post-treating the exhaled air after exiting the purification unit prior to entry to the one-way exhaust valve.

16. The method of claim 13 wherein the air intake nozzle is positioned between approximately one and ten inches from the breathing zone of the person, maintaining the air gap between the person and the nozzle.

17. The method of claim 13 wherein the airborne pathogens and contaminants comprise viruses and bacteria.

18. The method of claim 17 wherein the viruses comprise coronaviruses such as SARS-CoV-2.

19. A system for reducing airborne pathogens and contaminants in a breathing zone of a person comprising:
   a. a manifold assembly including a multi-port valve coupled to multiple tubes each fitted with an air intake nozzle positioned at breathing zones of one or more persons such that an air gap is created between each person and each nozzle, wherein exhaled air is routed from each person to the manifold assembly via the tubes;
   b. a purification unit for deactivating and/or filtering airborne pathogens and contaminants of the exhaled air supplied from the manifold assembly; and
   c. a suction assembly for drawing the exhaled air from each person, through the manifold assembly and the purification unit, to a one-way exhaust value.

20. The system of claim 1 wherein the purification unit includes a plasma reactor.

21. The method of claim 13 wherein the purification unit includes a plasma reactor.

* * * * *